(12) United States Patent
Lucke

(10) Patent No.: US 7,885,780 B2
(45) Date of Patent: Feb. 8, 2011

(54) OPERATING DEVICE FOR CALIBRATING TORQUE WRENCHES

(75) Inventor: Michael Lucke, Wuppertal (DE)

(73) Assignee: Eduard Wille GmbH & Co. KG, Wuppertal (DE)

( * ) Notice: Subject to any disclaimer, the term of this patent is extended or adjusted under 35 U.S.C. 154(b) by 0 days.

(21) Appl. No.: 12/380,467

(22) Filed: Feb. 27, 2009

(65) Prior Publication Data

US 2009/0222222 A1 Sep. 3, 2009

(51) Int. Cl.
*G01L 5/24* (2006.01)
(52) U.S. Cl. .................................... 702/108
(58) Field of Classification Search ............... 702/108

See application file for complete search history.

(56) References Cited

U.S. PATENT DOCUMENTS

| 4,759,225 A | 7/1988 | Reynertson et al. |
| 4,864,841 A | 9/1989 | Heyraud |
| 4,976,133 A | 12/1990 | Pohl |
| 6,595,034 B1 * | 7/2003 | Crane et al. ............ 73/1.12 |
| 6,865,958 B2 | 3/2005 | Herbold |
| 7,594,446 B2 | 9/2009 | Schwafertz |

* cited by examiner

*Primary Examiner*—Tung S Lau
(74) *Attorney, Agent, or Firm*—Lawrence G. Fridman

(57) ABSTRACT

The invention relates to an operating device for testing torque wrenches with a data storage. A carrier is provided for fixing a torque wrench to be tested. A transducer is arranged at the carrier and coupled to the head portion of the torque wrench to be tested. A grip holder arranged on the carrier fixes the grip of the torque wrench to be tested. A deflecting mechanism generates a torque on the head portion of the torque wrench to be tested. A communication unit is coupled to the data storage of the torque wrench for data exchange.

19 Claims, 3 Drawing Sheets

OPERATING DEVICE FOR CALIBRATING TORQUE WRENCHES

FIELD OF THE INVENTION

The invention relates to testing equipment in general and specifically it relates to an operating device for calibrating torque wrenches.

BACKGROUND OF THE INVENTION

Torque wrenches are tools which are used to establish screwed connections with bolts being preloaded with a pre-defined force. In doing so screwed connections are loaded with big or small preload forces. The increasing application of new construction materials such as magnesium, aluminum and synthetic material leads to a steadily increasing number of sensitive screwed connections.

The torque wrench consists of a wrench lever with a grip and a wrench head, wherein the wrench head often is formed as squared fitting and serves as coupling for other tool receptions. In this way different insert tools for turning bolts or nuts can be placed on the squared fitting. In the process of establishing screwed connections, a force is transferred from a user to the wrench lever and the wrench head generating torque forces acting on a bolt or nut. The torque wrench is provided with a measuring device for measuring the exerted torque. With further devices the measured torque can be displayed continuously or the reaching of a preset torque is indicated.

Torque wrenches come in different mechanical or electronic designs. One example belonging to the mechanical group are the so-called clicker torque wrenches, which buckle or break by reaching a desired torque and in this way avoid further inducing of a moment. The measurement of electronic and digitally displaying torque wrenches is for example achieved by a strain gauge attached to a bending or torsion rod. Strain gauges change their electric resistance at small deformations. They are glued to steal parts such like the bending or torsion rod by using a special adhesive. One example of the torsion rod is a rod with fixed supports at both ends and a spring in the middle. In this way pivoting around the axis of rotation of the torsion rod is possible, which can be measured by the strain gauge. The obtained measurement signal is displayed on a display. Preset torques can be checked permanently during the tightening process by means of LEDs or the display. At the same time this kind of torque wrench can store all measurements or releasing made in an internal measured data storage. This data storage can then be readout via an interface or printed directly with a connected printer at all times.

The measuring device of the torque wrench is normally subjected to common wear and tear symptoms. The torque wrench must be calibrated and, if necessary, adjusted from time to time with an operating device to check if a torque measured with the measuring device is the same as an exerted torque. For this purpose a carrier with a transducer and a grip holder is provided in the operating device. The head portion of the torque wrench is tightly coupled to the transducer, for example with the square fitting. The grip of the torque wrench is fixed by the grip holder. A torque is exerted on the head portion of the torque wrench by a deflecting mechanism. This torque is measured by the transducer und displayed on a display provided at the operating device, for example at the transducer. The torque displayed by the torque wrench or a preset torque of the torque wrench for a release can be tested by comparison with the torque displayed on the display.

With known operating devices for testing torque wrenches different deflecting mechanisms for the generation of a torque are used. In principal two ways are possible for generating a torque at the head portion of a torque wrench. The transducer is either rotatably fixed to the carrier and the grip holder is immoveable coupled to the carrier or, in the other way, the transducer is immoveable fixed to the carrier and the grip holder is moveably mounted to the carrier.

The procedure of a calibration is predetermined and subject to a specific standard, e.g. according to the German DIN standard. In the beginning of a measurement for testing a torque wrench five preloads at 100% of nominal torque of the torque wrench are accomplished. Then five loads at 20%, at 60% and at 100% of the nominal torque are carried out. Up to now the test torques for a torque wrench have to be set individually when using common operations devices. The electro motor transfers the force to the head of the torque wrench with a deflecting mechanism which in particular can be designed as a gearing. The torques of the torque wrench to be tested are detected by a transducer. On the one hand the examiner has to enter the required test torques and on the other hand he has to read the values measured by the transducer. This leads to a large expenditure of time for calibrating torque wrenches according to the required standard.

SUMMARY OF THE INVENTION

The invention relates to an operating device for testing torque wrenches comprising:
  (a) a carrier for fixing a torque wrench to be tested;
  (b) a transducer arranged at the carrier and coupled to the head portion of the torque wrench to be tested;
  (c) a grip holder arranged on the carrier for fixing the grip of the torque wrench to be tested;
  (d) a deflecting mechanism for generating a torque on the head portion of the torque wrench to be tested; and
  (e) a communication unit coupled to the data storage of the torque wrench for data exchange The invention is based on the principle of exchanging data between the communication unit and the torque wrench. The controlling of the calibration is carried out manually by the examiner with operation devices according to prior art. Up to now the nominal torques and resultant test torques of the torque wrenches to be tested are calculated by the examiner himself and then entered and approached manually. With the communication unit according to the invention it now is possible to achieve an automation of the calibration of torque wrenches. Basically this operating device can also be used for other torque tools as the described torque wrenches, for example torque screw drivers detecting torques. The communication unit has the great advantage that input errors by the examiner are avoided and test procedures are expedited.

According to one aspect of the present invention the data storage of the torque wrench is in the form of an electronic data storage. This has the advantage since a direct data exchange is possible with the communication unit and the torque wrench. For this purpose the communication unit preferably comprises a digital processor unit with a storage. The nominal torques of the torque wrenches to be tested can be directly read into the communication unit by the electronic data exchange. In this way rapid and accurate tests are achievable.

As to another aspect of the present invention the connection between the communication unit and the torque wrench is provided as a cable connection, a radio connection or an infrared connection. With this interface a fast data exchange is possible between the communication unit and the torque wrench. Furthermore a spacial separation of operating device and communication unit is possible especially with a radio connection or an infrared connection. The examiner would be able to operate several operating devices by one communication unit. In the broader sense many operating devices could be maintained centrally via one communication unit. This is particular economic and requires little space for calibrating torque wrenches.

As to a further aspect of the present invention the torque wrench is adapted to release at a set torque and wherein the respective set torque to be tested is set in the electronic data storage of the torque wrench with means of the communication unit. This has the great advantage that the examiner does not have to calculate and enter the individual torques to be tested manually. The communication unit directly determines the test torques according to the standardization of the torque wrenches and transfers these torques to the electronic data storage of the torque wrench. Thus the measurement of the torque wrench can be carried out very quickly and accurate, since the examiner no longer has to enter the individual test torques manually.

As to still another aspect of the present invention the data storage of the torque wrench is provided as optical code. The relevant data for the measurement are stored in the optical code of the torque wrench. After entering the optical code into the communication unit the according test torques are determined and used for the measurement. With this measure according to the invention non-electronic torque wrenches can also be calibrated by the operating device. The examiner transfers the test torques of the torque wrenches to the communication unit by means of the optical code so that the individual test torques have to be entered no longer manually.

As to still further aspect of the present invention for the torque wrenches with optical code the communication unit comprises a scanner for reading the optical code. This has the advantage of preventing errors by the examiner which can occur with a manual input of the optical code. The scanner is connected to the communication unit directly and thereby shortens and optimizes the data input for the torque wrenches substantially. In doing so the optical code for example is a bar code.

According to another aspect of the present invention a digital data storage is allocated to the transducer for digitally storing at least one measured value. This has the advantage that a recording of a test procedure is possible and an archiving of test procedures is permitted for the user by storing the measured torque values. A further advantage of the digital storage is the comparability of different test processes. Thus the reproducibility of test processes is ensured.

According to a further aspect of the invention an evaluation unit for processing and/or storing transmitted data from the torque wrench and/or at least one measured value from the transducer is provided with a modification according to the present invention. In doing so created measurement records can be compared with earlier or later recordings. Furthermore the evaluation unit provides the advantage of comparing the measured properties of different torque wrenches with one and another. Thus different makes of torque wrenches can be compared and judged on base of their signs of wear.

According to still another aspect of the present invention the operating device for calibrating a torque wrench with data storage comprises a control unit controlling the defection mechanism for the torque to be tested. This has the advantage that the deflecting mechanism accurately transfers the test torques to the head of the torque wrench. For example the calibrating of torque wrench can be accomplished automatically if the control unit communicates with the communication unit in a suitable manner.

In a further aspect of the present invention a servo motor for actuating the deflecting mechanism is provided to an operating device for testing a torque wrench with data storage. A uniform deflection of the deflecting lever is ensured by this measure. The examiner no longer has to move the deflecting lever by a crank as usual so that measurement errors due to different tightening speeds are avoided. Measuring processes can easily be automated by a suitable control of the motor.

According to still further aspect of the present invention means for controlling the deflection mechanism in accordance with data transferred by the torque wrench to the communication unit are provided to the operating device for testing a torque wrench with data storage. For example these means can be a spindle or a belt drive actuated by a drive. A direct drive by, for example, an electro motor is also possible.

As to still another aspect of the present invention means for justifying the torque wrench are provided for the operating devices for testing a torque wrench with data storage. If necessary an adjustment is required after measuring the torque wrenches. This can be accomplished manually by a tool or automatically by adequate devices. The torque wrenches cannot be used for work until the adjustment is accomplished.

As to another aspect of the present invention a data storage is provided storing a database of data for measurements of the torque wrench. Therewith the communication unit can access data stocks which in particular would exceed the size of the storage of a torque wrench. For example it suffices to register only the serial number of the torque wrench to be tested. The communication unit obtains the appropriate data for the measurement program from this data base.

Further modifications and advantages become apparent from the subject matter of the claims, as well as the drawings with the corresponding description.

DESCRIPTION OF THE EMBODIMENTS OF THE INVENTION

Figure 1:
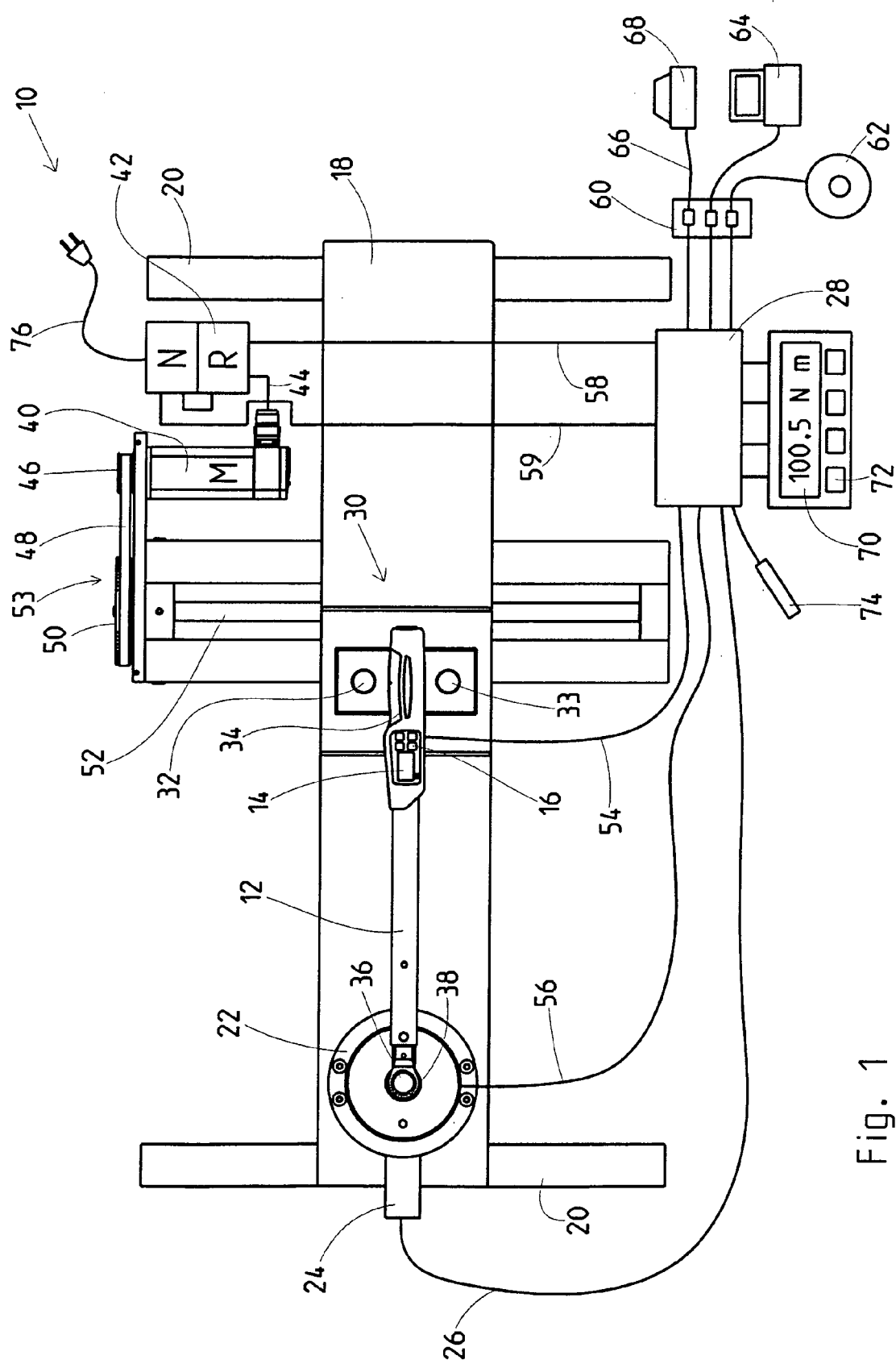
FIG. 1 is top view of a schematic principle diagram of an operating device with a communication unit according to the invention.

Referring to FIG. 1, wherein an operating device 10 for testing torque wrenches 12 with a data storage 14 and a control panel 16 is shown. The operating device 10 comprises a carrier 18 with two pedestals 14 which may be screwed to a basis and hence ensure a safe stand. A transducer 22 is mounted to the carrier 18 and comprises volatile data storage 24. The volatile data storage 24 is linked via a connection 26 to a communication unit 28 which for example can be a processor-controlled board. A grip holder 30 provided with a first and a second pin 32, 33 is located on the carrier 18. The grip 34 of the torque wrench 12 is arranged in the grip holder 30 between the pins 32, 33. The head 36 of the torque wrench 12 is coupled tightly to the transducer 22 by a reception 38.

The operating device 10 is provided with a servo motor 40 which is controlled by a motor control via a cable 44. The servo motor 40 actuates a small pulley 46 of a belt drive 49.

For conversion a belt 48 transmits to a bigger pulley 50 connected to a spindle 52. The spindle 52 is comprised by a deflection mechanism 53. For this purpose the deflection mechanism 53 is provided on the bottom side of the carrier 18 of the operating device 10.

The communication unit 28 is connected to a data storage 14 of the torque wrench 12 and the data storage 24 of the transducer 22 by cables 54, 56. In addition the communication unit 28 communicates with the servo motor 40 via the motor control 42 and connections 58, 59. The communication unit 28 comprises a data bus 60 to which an external peripheral device like a storage drive 62 or a data processing equipment 64 is connected as processing unit. The data bus 60 of the communication unit 28 can also drive a printer directly via a suitable printer interface 66. For example the printer prints calibrating certificates or other measurement records. The communication unit 28 comprises a display 70 and is operated by a control panel 72.

Furthermore a scanner 74 is connectable to the communication unit 28. If the torque wrench 12 is not provided with a own digital data storage 14, the information concerning the torque wrench 12 can also be memorized as bar code and then glued to the torque wrench. The bar code can be read by the scanner 74 and transmitted to the communication unit 28. The operation device 10 is energized by a power supply 76.

Figure 2:
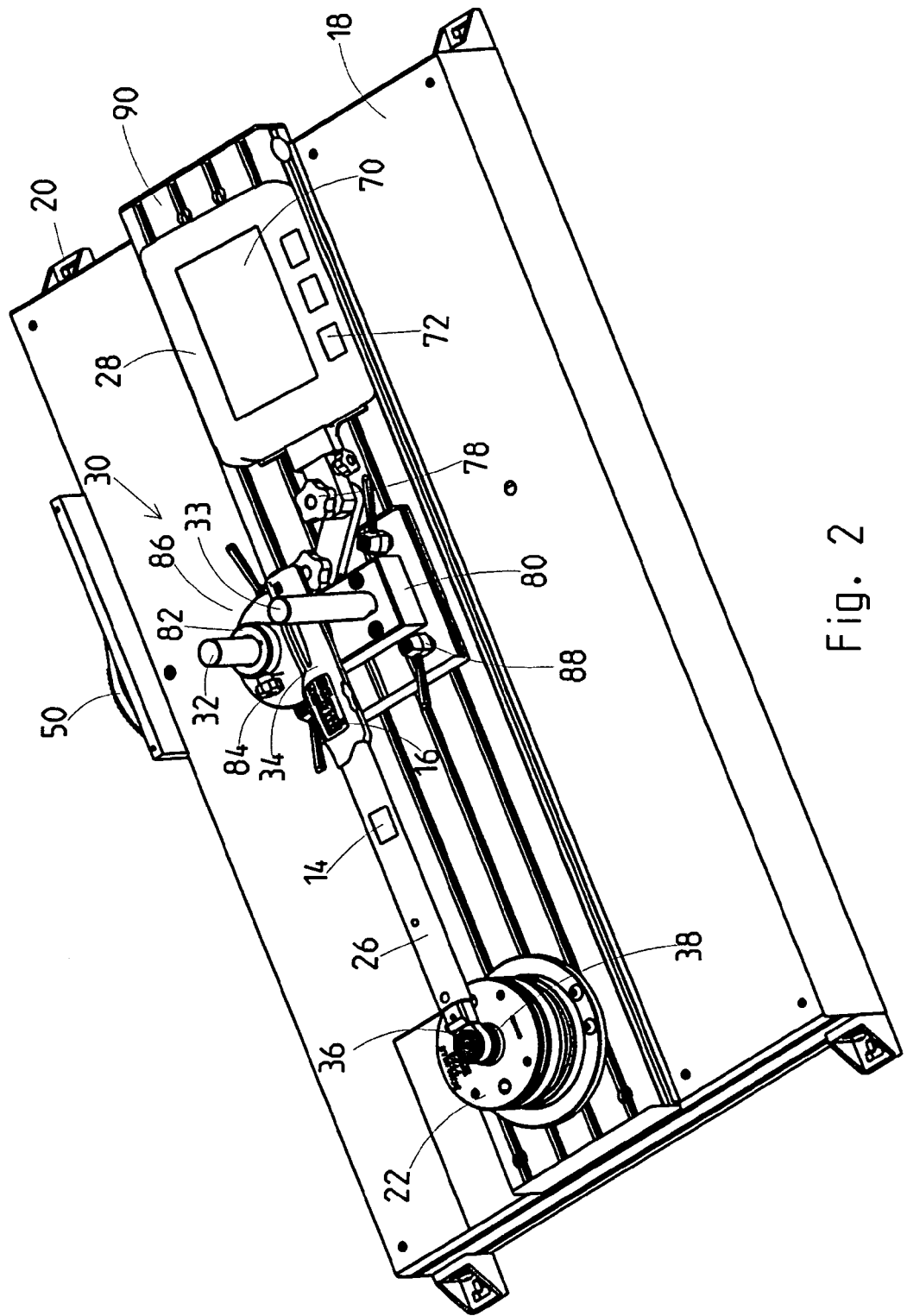
FIG. 2 is a top perspective view of the schematic principle diagram of the operating device.

Referring now to FIG. 2, wherein the operating device 10 is shown together with the communication unit 28. The display 70 with the control panel 72 is shown at the communication unit 28. The communication unit 28 is coupled to the grip holder 30 by fastening means 78. The pins 32, 33 are arranged on a bridge 80 of the grip holder 30. The first pin comprises a sleeve 82 having a support surface 84 at the lower end. The sleeve 82 is easy slidable upon the pin 32 and can be fixed to it by a clamping screw 86. Due to the repositionability of the sleeve 82 on the first pin 32 vertical friction forces are prevented as far as possible during a measurement procedure. This enables a smooth torque transfer to the torque wrench 12.

The grip holder 30 is fixed to a rail 90 of the operating device 10 by clamping levers 88. The entire grip holder 30 can be shifted upon the rail 90 of the carrier 18 by releasing the clamping levers 88. In this way the operating device 10 is adjustable to different sizes of torque wrenches 12 to be calibrated. The head 36 of the torque wrench 12 couples to the transducer 22 by a reception 38. The big pulley 50 of the belt drive 49 is shown on the side of the operating device 10.

Figure 3:
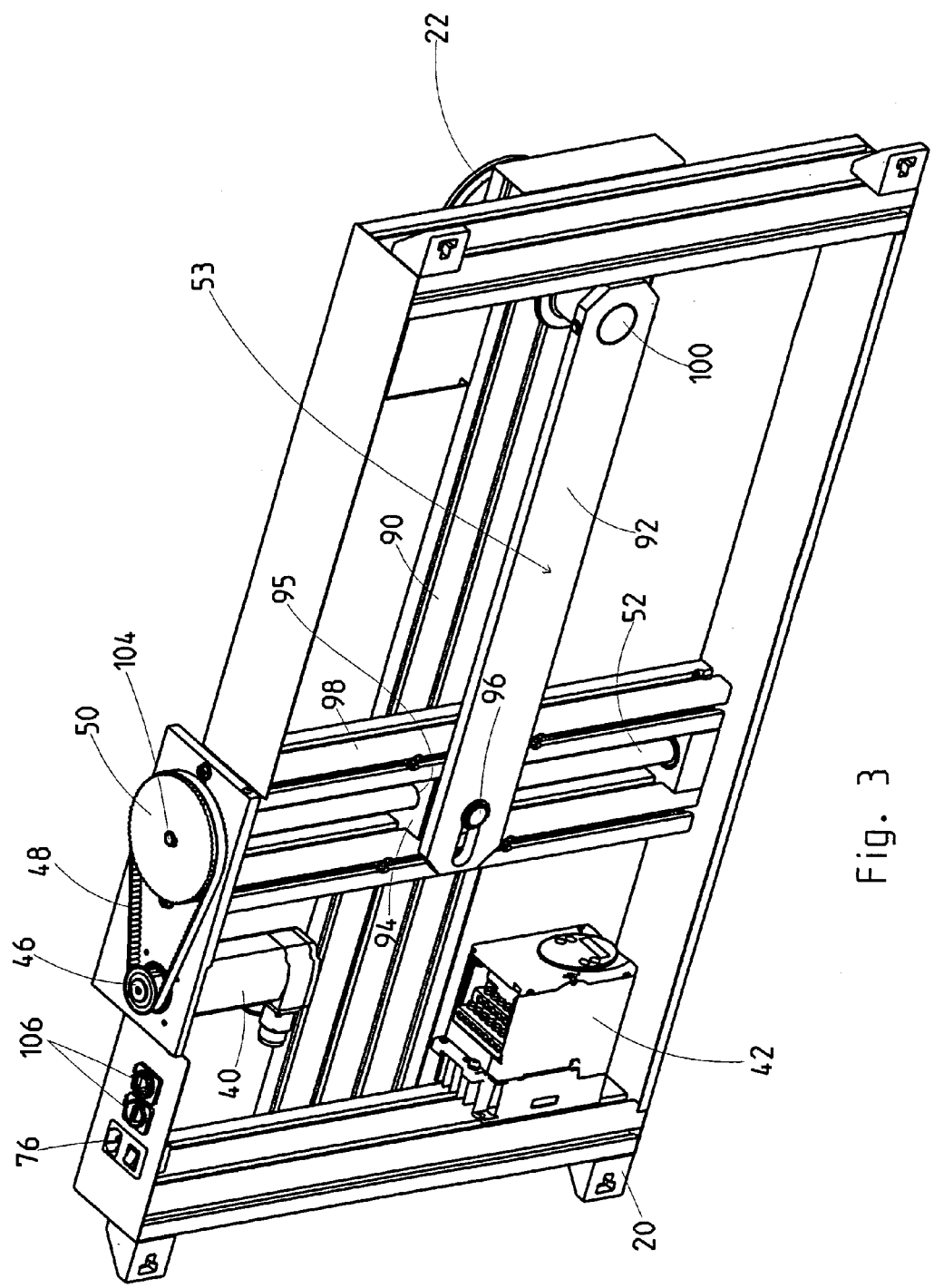
FIG. 3 is a bottom perspective view of the schematic principle diagram of the operating device.

FIG. 3 is a bottom view of the operating device 10. In this view the deflecting mechanism 53 is clearly visible. On end of a deflecting lever 92 flexibly joins to a spindle skid 94. The spindle skid 94 comprises a threaded hole 95. By turning the spindle 52 and the interaction of the threaded hole 95 with the spindle 52 the spindle skid 94 is actuated along the axis of the spindle in one direction or another depending on the direction of rotation. Guide rails 98 are additionally provided in parallel to the spindle 52 for a stable guiding of the spindle skid 94.

A bolt 96 flexibly holds the deflection lever 92 to the spindle skid 94 while the deflecting lever 92 is deflected by the spindle skid along the spindle axis during a measurement. A pivot pin 100 is arranged at the other end of the deflecting lever 92. The pivot pin 100 is guided through a recess in the carrier 12 and coupled to the transducer 22 as well as the head 36 of the torque wrench 12. The pivot pin 100 is rotatably held at the carrier 18 by a bearing 102. The servo motor 40 controlled by the motor control 42 is arranged behind the spindle 52 and actuates the small pulley 46 of the belt drive 49. The supply connection 72 is located on the side of the operating device. The operating device can be connected to other devices by diverse interfaces 106.

The operating principles of the operating device 10 can be described as follows. For a measurement the head 36 of the torque wrench 12 is inserted into the transducer 22 by the reception 38. The grip 34 of the torque wrench 12 lies in the grip holder 30 which is moveable upon the rail 90 of the carrier 18 for adjustment according to the size of the grip 34. The data storage 14 of the torque wrench 12 communicates with the communication unit 28 through cable 54. The communication unit 28 reads out the data storage 14 of torque wrench 12 for obtaining for example stored nominal torques, torque wrench type, serial number and/or testing programs for a measurement to be performed. The nominal torque of the torque wrench 12 as well as the set value is displayed on the display 70. The communication unit 28 or the connected data processing unit 64 now calculates the test torques to be performed internally.

The communication unit 28 issues the command to exert one of the calculated test torques onto the torque wrench 12 via the motor control 42 controlling the drive of the servo motor 40. For this purpose the big pulley 50 of the belt drive 49 actuates the spindle 52. The spindle 52 deflects the deflecting lever 92 of the operating device 10 so that the test torque is transmitted to the head portion 36 of the torque wrench 12 by means of the deflecting lever 92 and via the pivot pin 100.

The transducer 22 measures the actual exerted torque. The result is stored in the volatile storage 24 used as temporary storage and readout by the communication unit 28. Subsequently the actual value is compared to the nominal value either directly in the communication unit 28 or in an external data processing unit 64. After completion of measurement the data is sent to the printer 68 which for example prints calibrating certificates. Alternatively or in combination the data can be stored and archived in the data processing equipment 64.

An adjustment of the torque wrench 12 is carried out after the measurement either manually or immediately by the communication unit 28. Thereto data or digital characteristic curves adapted accordingly to the calibration are retransferred into the data storage 14 of the torque wrench 12.

The testing of the torque wrench 12 usually is accomplished with different test torques. The testing is subject to a certain standard and always should be carried out equally for comparability. For example five preloads with 100% nominal torque of the torque wrench 12 to be tested are carried out in each test. Subsequently five tests with each 20%, 50% and 100% nominal torque are carried out.

Now the communication unit 28 has the ability to control all necessary work steps for a test completely automatically. On the on hand this comprises reading of the nominal test torque of the respective torque wrench 12 from the data storage 14 of the torque wrench 12 by means of the communication unit 28. On the other hand the required test torques are calculated automatically by the communication unit 28 or the external data processing equipment 64 and the testing of the torque wrenches 12 is initiated. For this purpose the data for different types of torque wrenches 12 can also be stored in a data base of the data processing equipment 64. After reading, for example, the torque wrench type or a serial number from the data storage 14 the according measurement program is requested from the data base of the data processing equipment 64. For this purpose the data base is read out by the communication unit 28 and the testing is carried out with the read data. The resultant data is passed to the servo motor 40 via the motor control 42. The servo motor 40 controls the deflecting mechanism 53 accordingly.

The communication unit 28 as central point controls the entire calibration procedure of the torque wrench 12. Input errors by examiners inevitably occurring during measurements are eliminated by the communication unit 28. The timing is shortened formidable and the calibrating of torque wrenches is optimized economically. As a further result the measurement process is recorded completely automatically. The records can be archived digitally and/or printed out.

What is claimed is:

1. An operating device for testing torque wrenches, comprising:
    a torque wrench having a body with at least a head portion and a grip, a data storage forming a part of the body of the wrench;
    a carrier fixedly receiving the torque wrench, a grip holder arranged at said carrier for fixedly receiving said grip of the torque wrench;
    a transducer arranged at said carrier and adapted to have said head portion of said torque wrench coupled thereto;
    a deflecting mechanism for generating a torque to said head portion of said torque wrench; and
    a communication unit associated with said data storage of the torque wrench for a data exchange therebetween,
    wherein said communication unit reads out said data storage of the torque wrench for obtaining various characteristics for testing to be performed.

2. An operating device according to claim 1, wherein said communication unit is coupled to said data storage in the form of an electronic data storage.

3. An operating device according to claim 1, wherein a connection between said communication unit and said torque wrench is provided as a cable connection, a radio connection or an infrared connection.

4. An operating device according to claim 1, wherein said communication unit is adapted to couple to said data storage being an optical code.

5. An operating device according to claim 1, wherein a digital data storage is allocated to said transducer for digitally storing at least one measured value.

6. An operating device according to claim 1, wherein an evaluation unit is provided for processing or storing data transmitted from said torque wrench.

7. An operating device according to claim 1, wherein a control unit is provided for controlling said defecting mechanism for exerting a torque to be tested.

8. An operating device according to claim 1, further comprising an arrangement for controlling said deflecting mechanism in accordance with data transferred by said torque wrench to said communication unit and a servo motor for actuating said deflecting mechanism.

9. An operating device according to claim 1, further comprising an arrangement for justifying said torque wrench.

10. An operating device according to claim 1, wherein a data storage is provided for storing a database of data for measurements of said torque wrench.

11. An operating device according to claim 1, wherein said communication unit is coupled to the grip holder.

12. An operating device according to claim 1, wherein said communication unit is adapted to transfer data to said data storage of said torque wrench.

13. An operating device according to claim 2, wherein said torque wrench is adapted to release at a set torque and wherein the respective torque to be tested is set in said electronic data storage of said torque wrench by means of said communication unit.

14. An operating device according to claim 4, wherein said communication unit comprises a scanner for reading said optical code.

15. An operating device according to claim 6, wherein the evaluating unit is provided for processing and storing at least one measured value from said transducer.

16. An operating device according to claim 11, further comprising a fastening arrangement for fastening the communications unit to the grip holder.

17. A combination of an operating device for testing torque wrenches and a torque wrench to be tested by said operating device, said combination comprising:
    a torque wrench to be tested by an operating device having a body with at least a head portion and a trip, a data storage forming a part of the body of the wrench, said data storage is provided for storing a data associated with the wrench;
    the operating device having a carrier fixedly receiving the torque wrench, a grip holder arranged at said carrier for fixedly receiving said grip of the torque wrench;
    a transducer arranged at said carrier and adapted to have said head portion of said torque wrench coupled thereto;
    a deflecting mechanism for generating a torque to said head portion of said torque wrench; and
    a communication unit associated with said data storage of said torque wrench for data exchange therebetween.

18. A combination according to claim 17, wherein said communication unit is coupled to the grip holder.

19. A combination according to claim 17, wherein said communication unit reads out said data storage of the torque wrench for obtaining various characteristics for testing to be performed.

* * * * *